US012311656B2

(12) United States Patent
Tanto

(10) Patent No.: US 12,311,656 B2
(45) Date of Patent: May 27, 2025

(54) INK JET RECORDING APPARATUS

(71) Applicant: CANON KABUSHIKI KAISHA, Tokyo (JP)

(72) Inventor: Tomoaki Tanto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 18/060,499

(22) Filed: Nov. 30, 2022

(65) Prior Publication Data

US 2023/0173826 A1 Jun. 8, 2023

(30) Foreign Application Priority Data

Dec. 8, 2021 (JP) ................................ 2021-199623

(51) Int. Cl.
*B41J 11/00* (2006.01)

(52) U.S. Cl.
CPC ................................ *B41J 11/0024* (2021.01)

(58) Field of Classification Search
CPC .................................................. B41J 11/0024
See application file for complete search history.

(56) References Cited

U.S. PATENT DOCUMENTS

2009/0295898 A1* 12/2009 Takatsuka .............. B41J 13/226 347/104
2013/0027486 A1* 1/2013 Yamaguchi .......... B41J 11/0015 347/102
2021/0070068 A1* 3/2021 Hamada ............... B41J 11/0045

FOREIGN PATENT DOCUMENTS

WO 2019013755 A1 1/2019

* cited by examiner

*Primary Examiner* — Jason S Uhlenhake
(74) *Attorney, Agent, or Firm* — Canon U.S.A., Inc. I.P. Division

(57) ABSTRACT

An ink jet recording apparatus includes an image forming unit, a drying device, a heating device to heat a recording medium, and a guide member having a downstream end portion. The image forming unit discharges ink to form an image on the recording medium. The drying device dries the recording medium on which the ink has been discharged. The heating device includes a heating rotary member and a pressing rotary member to form a nip portion to transmit heat and pressure at the nip portion to the recording medium being conveyed on a conveyance path. The guide member is located between the nip portion and the drying device on the conveyance path and the downstream end portion of the guide member is disposed on a heating rotary member side with respect to a tangent line of the pressing rotary member drawn from a center of the nip portion.

9 Claims, 6 Drawing Sheets

IMMEDIATELY AFTER PRINTING

AFTER DRYING

AFTER HEATING AND FIXING

CURLING AMOUNT

INK JET RECORDING APPARATUS

BACKGROUND

Field

The present disclosure relates to an ink jet recording apparatus.

Description of the Related Art

A widely-used ink jet image forming apparatus discharges ink droplets to a recording medium from a discharge port of a recording head to form an image on the recording medium. WO2019/013755A1 discusses an image forming apparatus including a drying device that dries ink attached to a recording medium and a heating device that heats the recording medium. The drying device blows hot air onto the recording medium after printing to dry the ink adhered to the recording medium in a short time.

The heating device includes a heating rotary member and a pressing rotary member and is disposed downstream from the drying device in a conveyance direction of a recording medium. By conveying the recording medium to a nip portion formed by the heating rotary member and the pressing rotary member, heat and a pressure are applied to the recording medium.

In the ink jet image forming apparatus including the drying device and the heating device, the heating device applies heat and a pressure to the recording medium dried by the drying device.

In a case where the heating device applies heat to the recording medium, the heating device normally applies the heat to the recording medium at a fixing nip portion. However, in the case where the heat is applied to the recording medium only at the fixing nip portion, the heating device consumes a great amount of power.

SUMMARY

The present disclosure is directed to enabling a reduction in power consumption in the ink jet image forming apparatus including the drying device and the heating device.

According to an aspect of the present disclosure, an ink jet recording apparatus includes an image forming unit configured to discharge ink to form an image on a recording medium, a drying device configured to dry the recording medium on which the ink has been discharged, a heating device configured to heat the recording medium downstream from the drying device on a conveyance path of the recording medium, wherein the heating device includes a heating rotary member configured to heat the recording medium and a pressing rotary member configured to press the heating rotary member, wherein the pressing rotary member and the heating rotary member forming a nip portion configured to transmit heat and a pressure at the nip portion to the recording medium being conveyed, and a guide member having a downstream end portion on the conveyance path and configured to come into contact with the image and guide the recording medium to the nip portion, wherein the guide member is located between the nip portion and the drying device on the conveyance path and the downstream end portion of the guide member is disposed on a heating rotary member side with respect to a tangent line of the pressing rotary member drawn from a center of the nip portion.

Further features of the present disclosure will become apparent from the following description of exemplary embodiments with reference to the attached drawings.

DESCRIPTION OF THE EMBODIMENTS

<Image Forming Apparatus>

Figure 1:
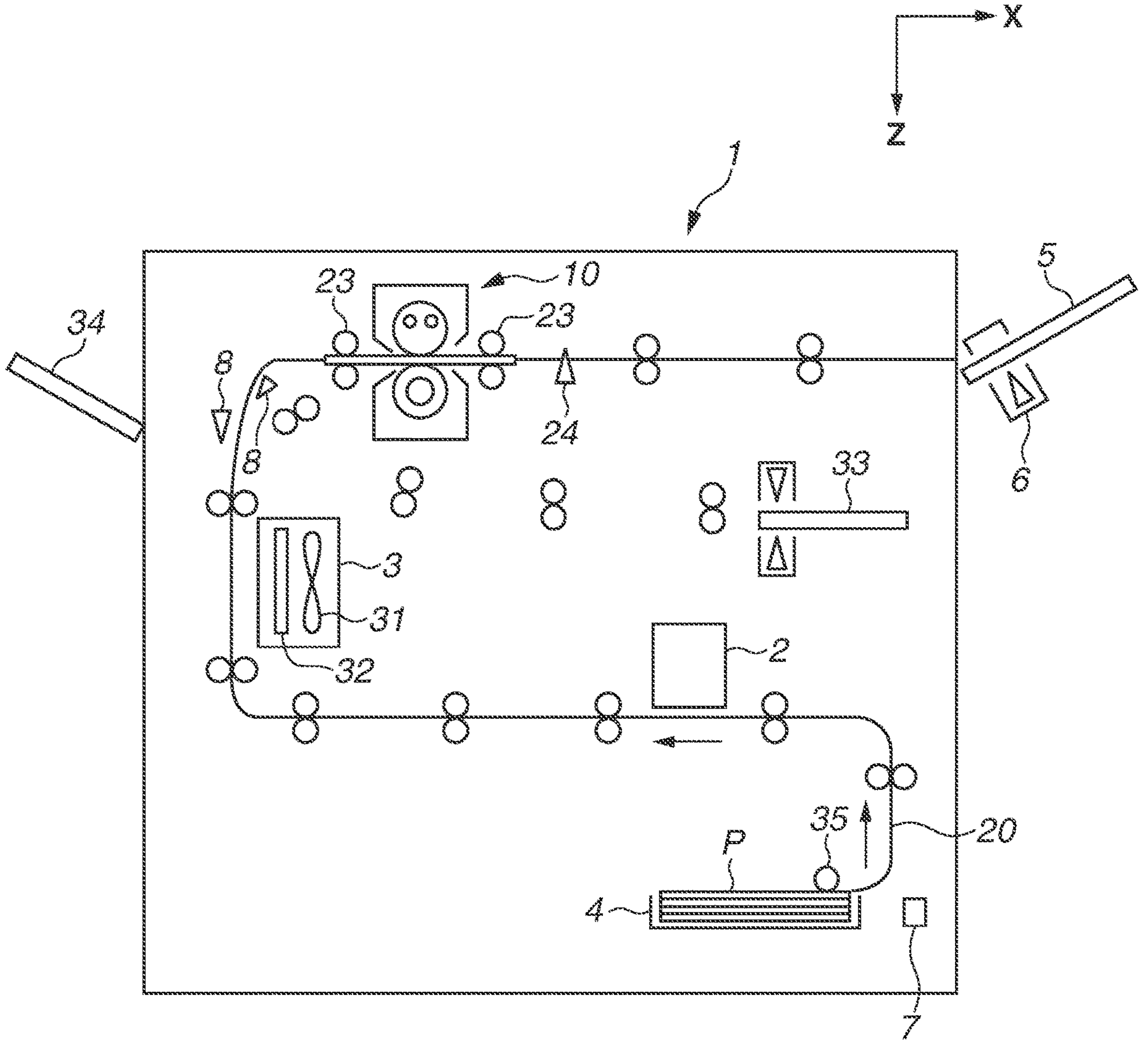
FIG. 1 is a schematic cross-sectional view of an ink jet image forming apparatus according to an exemplary embodiment.

First, an image forming apparatus according to an exemplary embodiment will be described. FIG. 1 is a schematic cross-sectional view of an image forming apparatus 1 according to the present exemplary embodiment. A recording medium P that is a sheet stored in a sheet storage portion 4 is taken out of the sheet storage portion 4 by a feeding roller 35, and is then conveyed along a sheet conveyance path 20 indicated by a solid line in the drawing by a plurality of pairs of rollers.

An ink jet recording unit 2 is a unit that discharges ink droplets onto the recording medium P to form an image. The ink jet recording unit 2 includes a line type print head in which an ink discharge port row is disposed orthogonally to a conveyance direction of a sheet within a range that covers a maximum sheet width in the image forming apparatus 1. The ink jet recording unit 2 includes a plurality of print heads corresponding to the number of ink colors to be used, i.e., four print heads for cyan, magenta, yellow, and black in the present exemplary embodiment. An ink discharge method may be a method using a heater element, a piezo element, an electrostatic element, a microelectromechanical system (MEMS) element, or the like. The ink of these respective colors is supplied from ink tanks via ink tubes to the print heads.

The recording medium P on which an ink image has been formed is sent to a drying device 3, and the ink having adhered to the recording medium P is dried. The drying device 3 includes a fan 31 that blows air to an image surface of the recording medium P, and a hot air heater 32 that heats the air blown from the fan 31. The fan 31 and the hot air heater 32 blow hot air to recording medium P to be capable of drying the ink on the recording medium P in a short time.

The dried recording medium P is conveyed to pass through a post-drying path 8, a pair of upstream rollers 23, and a heating device 10 in this order. The heating device 10 applies heat and a pressure to the recording medium P (details will be described below). This can prevent curling of the dried recording medium P. Thereafter, the recording medium P passes through a pair of downstream rollers 24 and is discharged onto a discharge tray 5. In a case where a plurality of output recording media P is stapled, after a predetermined number of recording media P are output, a stapling unit 6 performs stapling processing. A case where double-sided printing is performed on the recording medium P will be described. In the case where the double-sided printing is performed, the recording medium P where an image has been formed on one surface is conveyed to an inversion path disposed downstream from the drying device 3 in the conveyance direction of a recording medium. The ink jet recording unit 2 again forms an ink image on a back surface of the recording medium P reversed on the inversion path. The recording medium P then passes along the drying device 3 and through the heating device 10, similarly, to be subjected to the double-sided printing. The recording medium P is then discharged onto the discharge tray 5.

The process from the taking-out of a recording medium from the sheet storage portion 4 to the discharging of the recording medium onto the discharge tray 5 is image forming processing. Further, a time period during which the image forming processing is performed corresponds to a time period during which image forming is in progress. Note that in the image forming apparatus 1 according to the present exemplary embodiment, a humidity sensor 7 that detects a temperature and relative humidity in the image forming apparatus 1 is disposed near the sheet storage portion 4.

In addition, in the present exemplary embodiment, the humidity sensor 7 is disposed in the image forming apparatus 1 and near the sheet storage portion 4, but the disposing position is not limited to this. The humidity sensor 7 may be disposed outside the image forming apparatus 1.

<Heating Device>

The configuration of the heating device according to the present exemplary embodiment will be described below.

Figure 2:
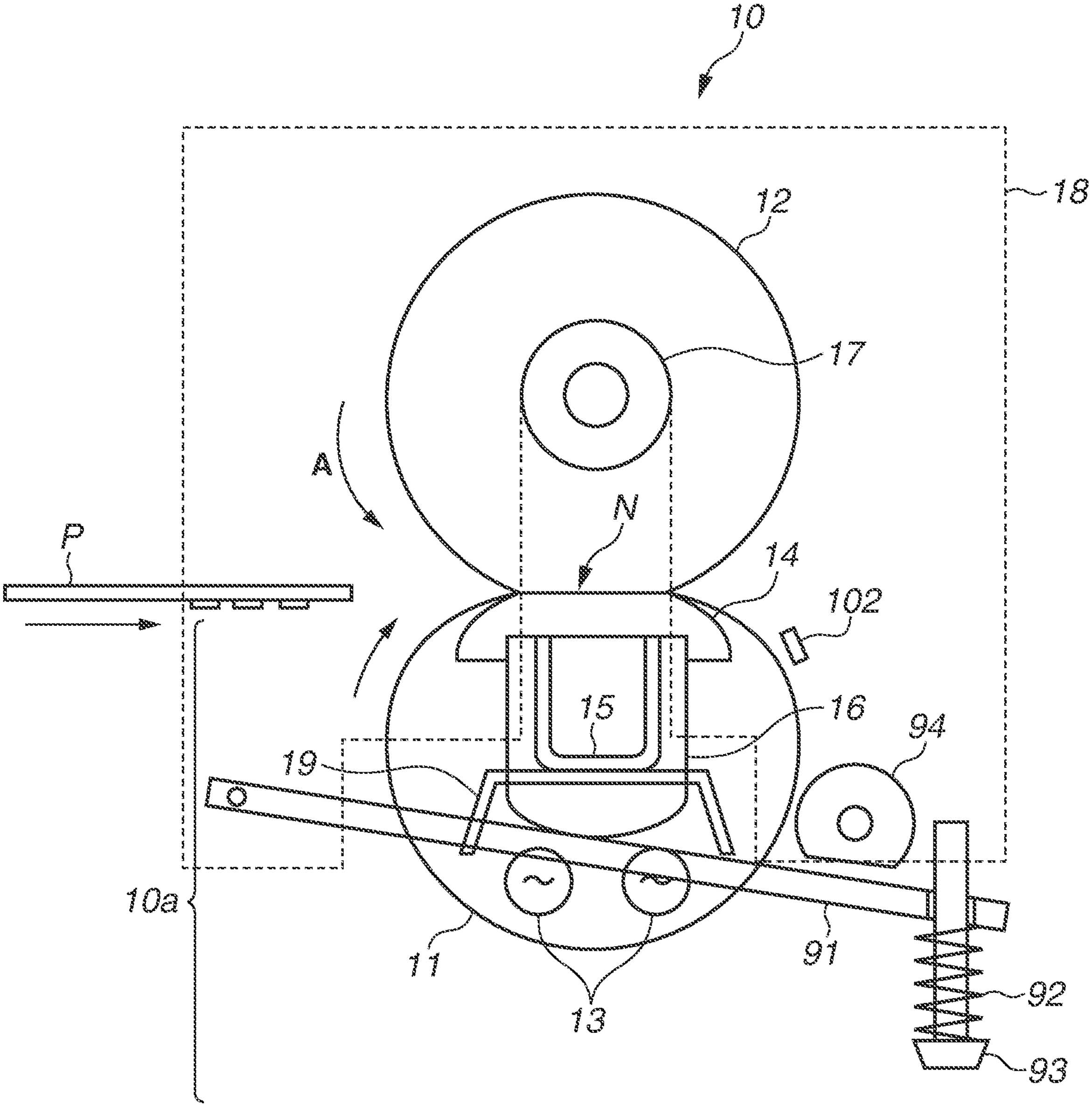
FIG. 2 is a schematic cross-sectional view of a heating device according to the present exemplary embodiment.

FIG. 2 is a cross-sectional view of the heating device 10. The heating device 10 is configured so that a recording medium is conveyed to a nip portion formed by a heating rotary member 11 and a pressing rotary member 12.

<Heating Rotary Member>

The heating rotary member 11 has an endless film. The film has a base layer, an elastic layer disposed outside the base layer, and a surface layer disposed outside the elastic layer. The base layer is made of stainless which is used as a cylindrical metal, or polyimide, which is a heat-resistant resin. The elastic layer is made of silicone rubber or the like and has constant elasticity. The surface layer is made of fluoroplastic. Thus, the surface layer has constant mold releasability. The constant mold releasability of the surface layer reduces adhesion of ink to the surface of the film.

At least one heater 13 is disposed as a heating source inside the film. In the present exemplary embodiment, two halogen lamps are used as the heaters 13. The heaters 13 are configured to be capable of directly heating an inner circumferential surface of the film. Further, a condensing plate 19 that collects the heat of the heaters 13 onto the inner circumferential surface of the film is disposed.

A pad member 14 that abuts on the pressing rotary member 12 via the film is disposed inside the film. The pad member 14 is made of a liquid crystal polymer resin or the like having heat resistance.

The pad member 14 is formed into a plate shape along a lengthwise direction of the film. Further, the pad member 14 is supported by a U-shaped stay 15. The stay 15 is made of metal and has high rigidity. When the pressing rotary member 12 presses the pad member 14 via the film, the stay 15 supports the pad member 14. As a result, the film and the pressing rotary member 12 form a fixing nip portion N.

<Pressing Rotary Member>

The pressing rotary member 12 is constituted by a core metal and an elastic layer disposed outside the core metal. The core metal of the pressing rotary member 12 is mainly made of metal. The elastic layer is mainly made of silicone rubber or the like. Further, a surface layer is provided outside the silicone rubber, and is made of fluoroplastic. In a lengthwise direction of the pressing rotary member 12, both the ends of the pressing rotary member 12 are rotatably supported to a frame 18 via a bearing portion 17.

A movement mechanism with which the fixing nip portion N is formed by the pressing rotary member 12 and the heating rotary member 11 will be described. The movement mechanism includes a pressing plate 91, a pressing spring 92, a pressing screw 93, and a pressing release cam 94.

In the lengthwise direction, the pad member 14 is longer than the film. In the lengthwise direction, a portion to be pressed 16 is disposed on both the ends of the pad member 14 exposed from the film. The pressing plate 91 is supported by the frame 18 with one end being a rotation center, and the other end opposite from the rotation center is pushed upwards by the compressed pressing spring 92 as viewed in FIG. 2. The portion to be pressed 16 abuts on an upper surface of the pressing plate 91, and is pressed upwards (towards the pressing rotary member 12) by the pressing plate 91 as viewed in FIG. 2. As a result, the pad member 14 is moved upwards in FIG. 2. The pressing rotary member 12 then abuts on the outer surface of the film, and presses the pad member 14 via the film, thereby forming the fixing nip portion N. When the movement mechanism pushes up the pressing plate 91 to form the fixing nip portion N, the heating rotary member 11 and the pressing rotary member 12 are in an abutment position. A pressing force is adjusted in such a manner that a compressing length of the pressing spring 92 is adjusted by changing a screwing length of the pressing screw 93 into the frame 18.

The pressing release cam 94 which has a rotary shaft supported by the frame 18 is rotated by a cam motor to separate the pressing plate 91 from the portion to be pressed 16, thereby pressure-releasing the heating rotary member 11 from the pressing rotary member 12. When the pressing plate 91 is pushed down by the movement mechanism to be separated from the portion to be pressed 16, the heating rotary member 11 and the pressing rotary member 12 are in a separation position. A cam position detection sensor (not illustrated) is disposed at the end of the rotary shaft to detect a position of the pressing release cam 94. The cam position detection sensor can determine a pressed state or a pressure released state.

The movement mechanism is disposed at both the ends of the heating device 10, and the respective portions to be pressed 16 at both the ends are pressed by the equal pressing force. This enables uniform pressing along an axial direction. In such a manner, the heating rotary member 11 and the pressing rotary member 12 can move to the abutment position and to the separation position.

The pressing rotary member 12 is connected to a pressing roller motor (not illustrated), and is rotated in a direction of an arrow A in FIG. 2. In a case where the heating rotary member 11 and the pressing rotary member 12 are in the abutment position, rotational driving of the pressing rotary member 12 causes the film to rotate. When a recording medium is conveyed to the fixing nip portion N, the heating rotary member 11 and the pressing rotary member 12 nip and convey the recording medium.

<Curling>

“Curling” that occurs on a sheet will be described with reference to FIGS. 4A to 4D.

Figure 4A:
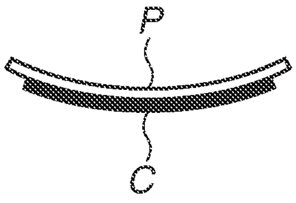
FIGS. 4A to 4D are diagrammatic illustrations of curling of a recording medium.
Figure 4B:
Figure 4C:
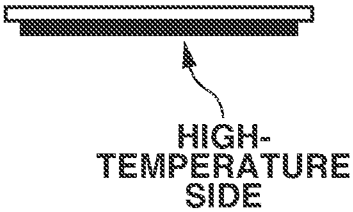
Figure 4D:
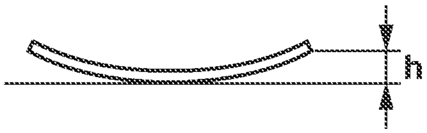

FIG. 4A is a diagrammatic illustration of a shape of a recording medium immediately after ink is supplied to the recording medium by the print head. FIG. 4B is a diagrammatic illustration of a shape of the recording medium immediately after the recording medium to which the ink has been supplied is dried by the drying device 3. FIG. 4C is a diagrammatic illustration of a shape of the recording medium after the recording medium is heated by the heating device 10. In the drawing, C indicates a surface to which the ink has adhered (image surface).

Description about the diagrammatic illustrations of FIGS. 4A to 4C will be given.

In FIG. 4A, moisture of the ink penetrates into the image surface, and thus a moisture content is higher on the image surface than on a back surface opposite from the image surface. At this time, curling occurs on the back surface, and the image surface becomes humped as illustrated in FIG. 4A. This is caused because the image surface expands due to the supply of the ink to the image surface.

In FIG. 4B, the curling easily occurs on the image surface due to drying of the recording medium by the drying device 3. This is because the moisture on the image surface is evaporated by the drying device 3, and the image surface contracts during the process of a decrease in the moisture content. At this time, the back surface becomes humped as illustrated in FIG. 4B.

In FIG. 4C, the recording medium has been heated and pressed by the heating device 10, and a curling amount of the recording medium is smaller than that in FIG. 4B. The heating device 10 heats and presses the recording medium. When the heating device 10 heats the recording medium, the image surface is heated at the fixing nip portion N by the heating rotary member 11 to have a high temperature, and thus a water vapor pressure increases. Since the image surface is pressed by the heating rotary member 11, the water vapor does not vaporize from the image surface, but moves to the back surface. Thus, the moisture content of the back surface increases. After the recording medium gets out of the fixing nip portion N, the moisture of the back surface vaporizes and thus the back surface contracts. As a result, a difference in the moisture content between the image surface and the back surface of the recording medium becomes small. Therefore, the heating and pressing of the recording medium after drying can correct the curling of the recording medium.

In the ink jet image forming apparatus 1 including the drying device 3 and the heating device 10, the heating device 10 applies heat and a pressure to the recording medium dried by the drying device 3. As described above, the heating device 10 mainly has a function for reducing the curling amount of a recording medium.

In a case where the heating device 10 applies heat to the recording medium P, the heat is normally applied at the fixing nip portion N.

However, it is proposed that, before the recording medium P enters the fixing nip portion N, an amount of heat to be applied at the fixing nip portion N is reduced by pre-heating for heating the recording medium P.

Conventionally, since the recording medium P is conveyed to enter the fixing nip portion N, the effect of the pre-heating is low, and thus an amount of power consumed by the heating device 10 is great. Therefore, the ink jet image forming apparatus 1 including the drying device 3 and the heating device 10 aims to enable a reduction in the power consumption.

<Placement of Guide Member>

A guide member that guides the conveyance of the recording medium P to the fixing nip portion N in the present exemplary embodiment will be described below.

Figure 3:
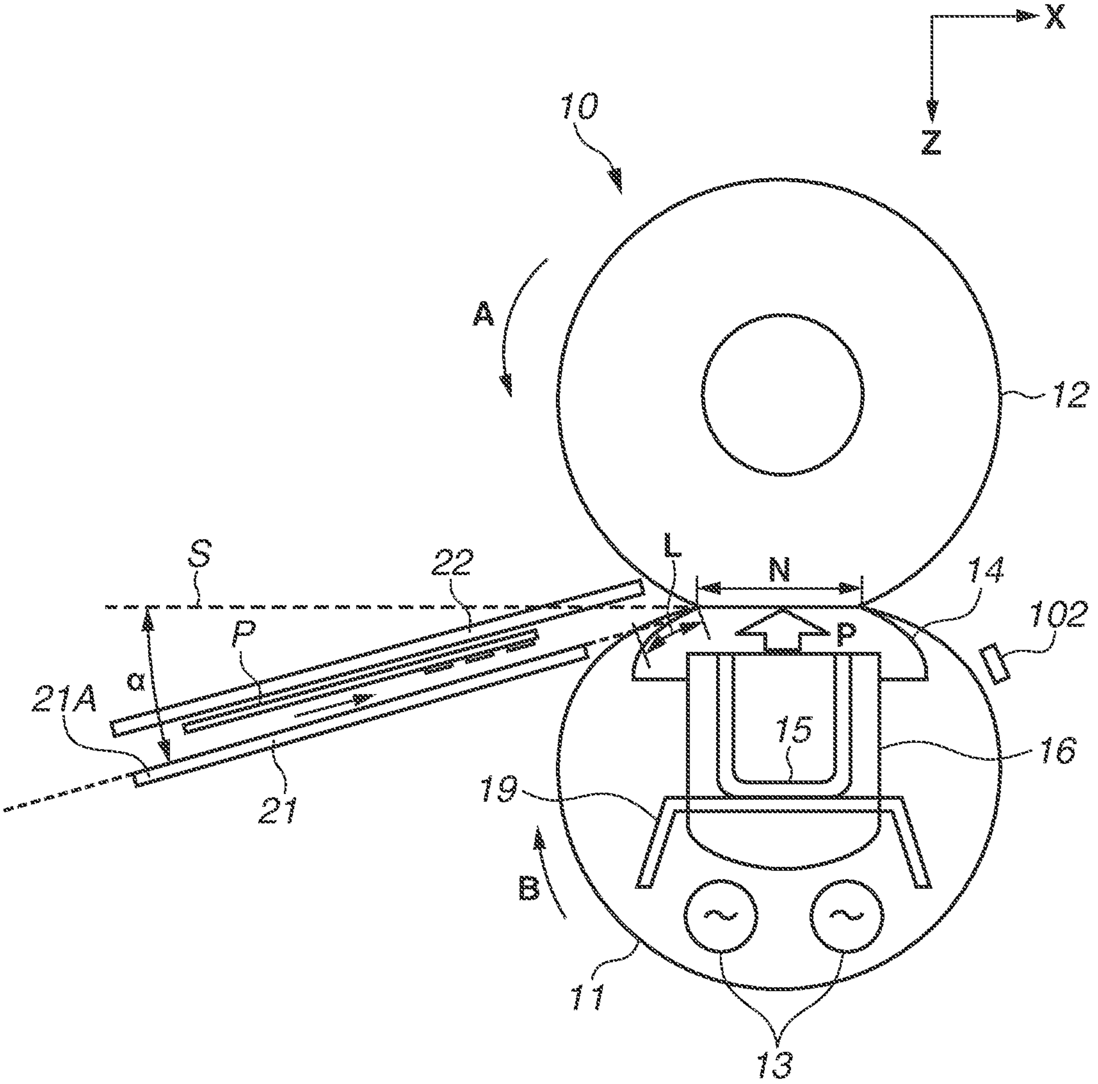
FIG. 3 is a schematic view illustrating an inclined angle between the heating device and a guide member according to the present exemplary embodiment.

As illustrated in FIG. 3, the guide member is disposed adjacently to an upstream side of the fixing nip portion N in the conveyance direction of a recording medium, and includes a pair of a guide member 21 closer to the heaters 13 in a Z direction and a guide member 22 opposing the guide member 21.

Placement of the guide member with respect to the heating device 10 will be described below. The guide member 21 is disposed with an inclined angle of $\alpha$ ($0^\circ<\alpha$) being formed between a sheet passing surface 21A for the image side of the recording medium P and an extension line S drawn from the fixing nip portion N. In the present exemplary embodiment, the angle $\alpha$ is formed below the extension line S (from the extension line S to below the lower surface of the recording medium P), i.e., on the heating rotary member 11 side. Further, the sheet passing surface 21A is placed in a position where, in the Z direction, an extension line of the sheet passing surface 21A overlaps the heating rotary member 11 in an area L of FIG. 3. Here, in a case where the inclined angle $\alpha$ is too great, the recording medium P has difficulty entering the fixing nip portion N. This causes a wrinkle or a corner bend on the recording medium P, and thus the inclined angle $\alpha$ desirably falls within a range of $0^\circ<\alpha<30^\circ$ in the present exemplary embodiment.

Figure 5:
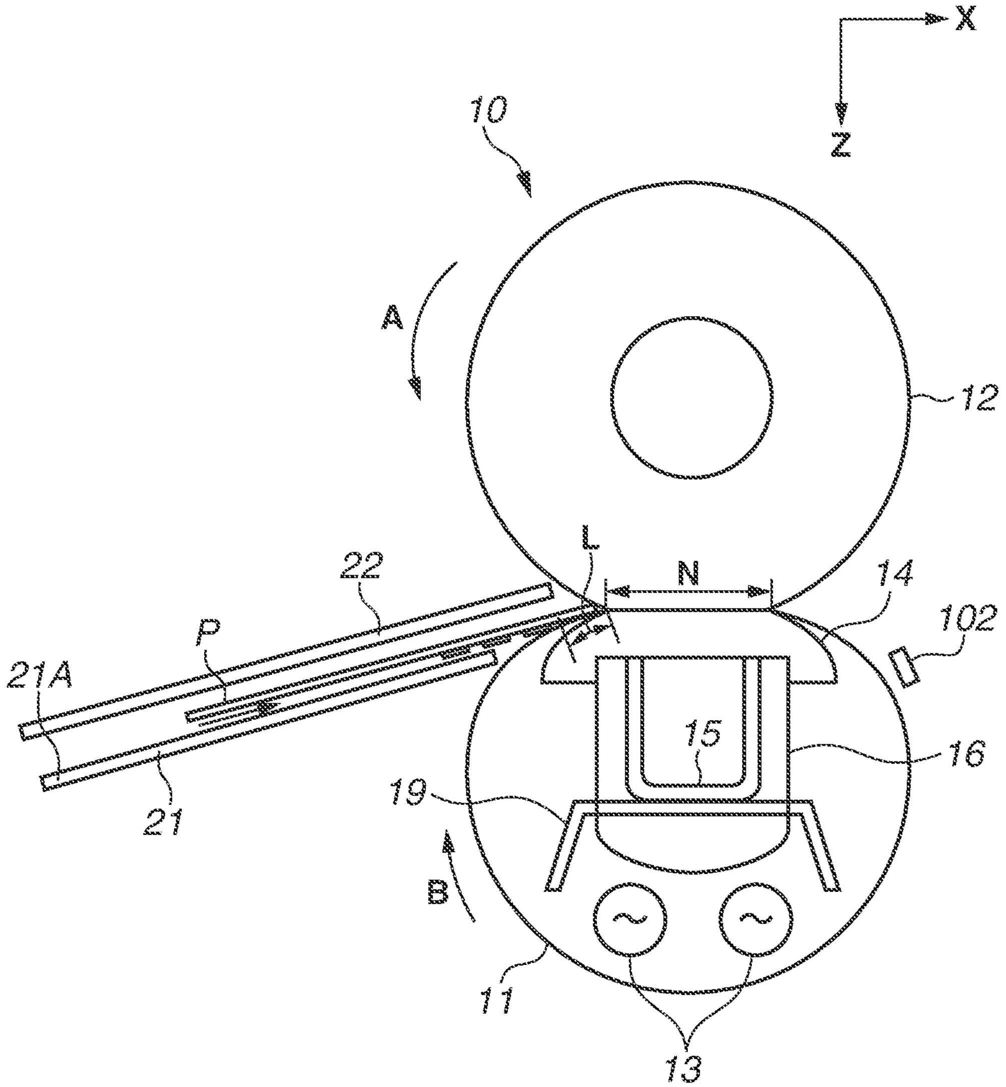
FIG. 5 is a schematic view of the guide member according to the present exemplary embodiment.

A state where the recording medium P is being supplied into the fixing nip portion N in the present exemplary embodiment will be described with reference to FIG. 5. FIG. 5 illustrates a state where a leading end of the recording medium P enters the fixing nip portion N and a trailing end of the recording medium P stays in the guide member. Due to the above-described placement relationship between the inclined angle $\alpha$ of the sheet passing surface 21A and the Z direction, in the state where the recording medium P is being supplied to the fixing nip portion N, the recording medium P comes into contact with the heating rotary member 11 not only in the fixing nip portion N but also in the area L upstream from the fixing nip portion N. As a result, the image surface of the recording medium P comes into contact with the heating rotary member 11 in the area L before entering the fixing nip portion N, and thus heat is given to the image surface from the heating rotary member 11.

Before the recording medium P enters the fixing nip portion N, the recording medium P comes into contact with the heating rotary member 11 between the guide members 21 and 22 and the fixing nip portion N to be heated while the recording medium P is at the fixing nip portion N. As a result, a heating amount at a time when the heating rotary member 11 heats the recording medium P at the fixing nip portion N can be set to be low. This can reduce the amount of power consumed by the heating device 10.

<Placement of Guide Member in Conventional Exemplary Embodiment>

In the following description, the present exemplary embodiment is compared with a conventional exemplary embodiment in a state where a recording medium P passes through a guide member and is conveyed to a fixing nip portion N.

Figure 6:
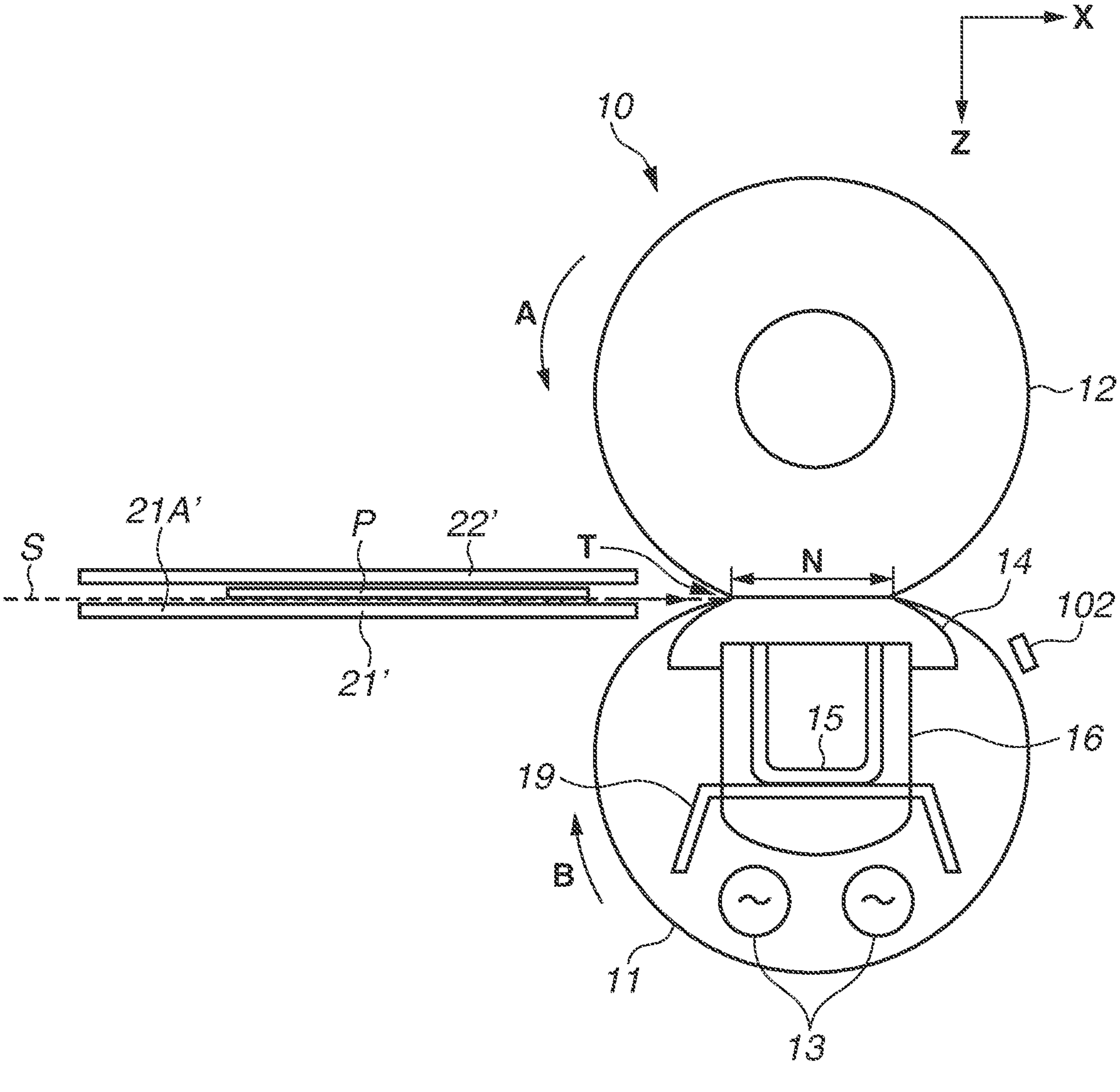
FIG. 6 is a schematic view of a conventional guide member.

FIG. 6 is a cross-sectional view of a heating device and a guide member that guides a recording medium P to the heating device in the conventional exemplary embodiment. As illustrated in FIG. 6, the guide member includes a pair of a guide member 21' on a side closer to heaters 13 in a Z direction and a guide member 22' opposing the guide member 21'.

Placement of the guide member with respect to the heating device will be described below. A sheet passing surface 21A' of the guide member 21' is parallel with an extension line S of the fixing nip portion N and is flush with the fixing nip portion N in the Z direction.

As a result, in the conventional exemplary embodiment, due to the above-described placement relationship between the guide member 21' and the fixing nip portion N, and between the guide member 21' and the heating rotary member 11, the recording medium P does not come into contact with the heating rotary member 11 until the recording medium P is nipped at the fixing nip portion N to be conveyed. For this reason, the pre-heating of the recording medium P is not assumed, and thus the recording medium P comes into contact with the heating rotary member 11 and receives heat at the fixing nip portion N.

<Effects of Placement of Guide Member in the Present Exemplary Embodiment>

As described above, compared to the conventional exemplary embodiment, the area where the recording medium P comes into contact with the heating rotary member 11 increases by the area L upstream from the fixing nip portion N in the present exemplary embodiment, thereby giving heat to the recording medium P also before the recording medium P enters the fixing nip portion N. As a result, in the present exemplary embodiment, a desired amount of heat given to the recording medium P at the fixing nip portion N in the conventional exemplary embodiment can be reduced by the amount of heat given in the area L upstream from the fixing nip portion N. Therefore, the amount of heat to be given at the fixing nip portion N is reduced by lowering the temperature of the heaters 13 in the heating rotary member 11, thereby reducing the amount of power consumption.

The guide member in the present exemplary embodiment is disposed to nip the recording medium P. Thus, the above description has referred to the configuration where the two guide members oppose each other. However, the present disclosure is not limited to this configuration, and may have any configuration where a recording medium is conveyed with the area L being formed upstream from the fixing nip portion N. Specifically, only the guide member 21 where the sheet passing surface 21A comes into contact with the recording medium P, out of the guide members 21 and 22 may be disposed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199623, filed Dec. 8, 2021, which is hereby incorporated by reference herein in its entirety.

What is claimed is:

1. An ink jet recording apparatus comprising:

an image forming unit configured to discharge ink to form an image on a recording medium;

a drying device configured to dry the recording medium on which the ink has been discharged downstream from the image forming unit;

a heating device configured to heat the recording medium downstream from the drying device on a conveyance path of the recording medium, wherein the heating device includes a heating rotary member configured to heat the recording medium and a pressing rotary member configured to press the heating rotary member, wherein the pressing rotary member and the heating rotary member form a nip portion configured to transmit heat and a pressure at the nip portion to the recording medium being conveyed;

a guide member having a downstream end portion on the conveyance path and configured to come into contact with the image and guide the recording medium to the nip portion, wherein the guide member is located between the nip portion and the drying device on the conveyance path and the downstream end portion of the guide member is disposed on a heating rotary member side with respect to a tangent line of the pressing rotary member drawn from a center of the nip portion; and a movement mechanism disposed at each of an upstream end and a downstream end of the heating device, wherein the movement mechanism includes a pressing plate, a pressing spring, a pressing screw, and a pressing release cam, wherein the recording medium is conveyed to pass through a post-drying path, a pair of upstream rollers, and the heating device, in this order, and the heating device is configured to apply heat and pressure to the recording medium.

2. The ink jet recording apparatus according to claim 1, wherein a surface of the heating rotary member is configured such that the image comes into contact with the surface of the heating rotary member between the nip portion and the guide member.

3. The ink jet recording apparatus according to claim 1, wherein the following conditional expression is satisfied:

$0^\circ<\alpha<30^\circ$ where $\alpha$ indicates an inclined angle of the guide member with respect to the tangent line.

4. The ink jet recording apparatus according to claim 1, wherein the drying device comprises a fan configured to blow air to an image surface of the recording medium, and a hot air heater configured to heat the air blown from the fan.

5. The ink jet recording apparatus according to claim 1, wherein the recording medium is conveyed to pass through a post-drying path, a pair of upstream rollers, and the heating device, in this order, and the heating device is configured to apply heat and pressure to the recording medium.

6. The ink jet recording apparatus according to claim 5, wherein the heating device is configured to apply heat and pressure to the recording medium to prevent curling of the recording medium.

7. The ink jet recording apparatus according to claim 1, further comprising a stapling unit configured to perform stapling processing.

8. The ink jet recording apparatus according to claim 1, wherein the ink jet recording apparatus is further configured to perform double-sided printing on the recording medium.

9. The ink jet recording apparatus according to claim 1, wherein each movement mechanism is configured to provide uniform pressing of the recording medium along an axial direction.

* * * * *